United States Patent Office 2,904,621
Patented Sept. 15, 1959

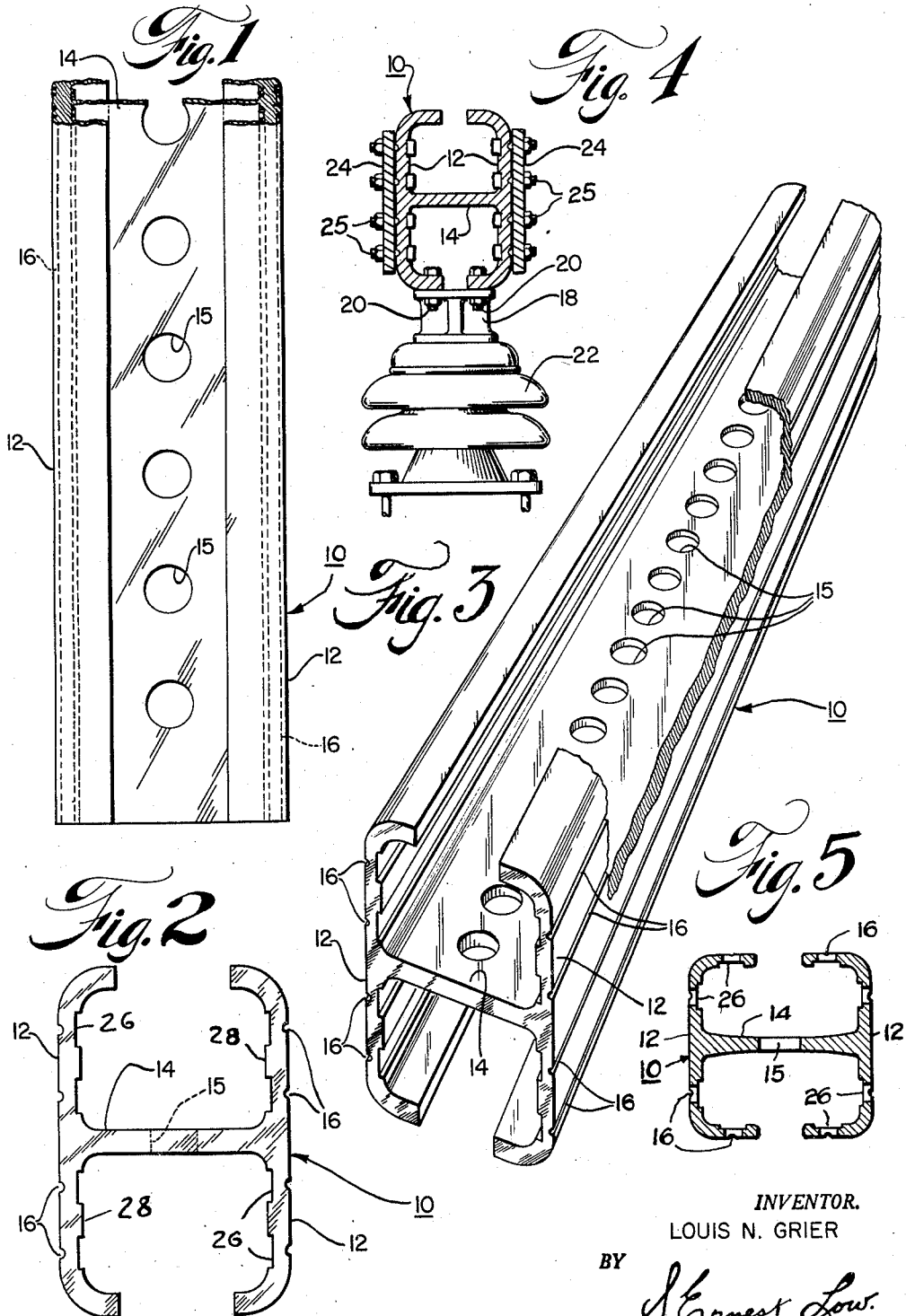

2,904,621

VENTILATED ELECTRICAL BUS BAR STRUCTURES

Louis N. Grier, Pittsburgh, Pa., assignor to Aluminum Company of America, Pittsburgh, Pa., a corporation of Pennsylvania Application November 30, 1955, Serial No. 550,032

1 Claim. (Cl. 174—126)

This invention relates to new and useful improvements in electrical bus bar structures and is more specifically addressed to rigid, ventilated bus bar sections and installations of the same capable of resisting deformation incident to conduction of relatively large current loads.

It is a primary object of the invention to provide a bus bar of geometric design and cross-section which will withstand relatively high short-circuit loading without distortion or collapse.

A further object of the invention is to provide an integral bus bar section which lends itself to fabrication by extrusion.

Other objects and advantages of the invention will be readily understood on consideration of the following description and drawing, in which:

Fig. 1 represents a top or bottom plan view of a bus bar section falling within the concept of the invention;

Fig. 2 represents an end elevational view of the bus bar section of Fig. 1;

Fig. 3 represents the bus bar of Figs. 1 and 2 in perspective view;

Fig. 4 represents an end sectional view of an installation embodying the thus far illustrated bus bar section of the invention; and Fig. 5 represents a cross-sectional elevation of a modified form of bus bar falling within the concept of the invention.

In general terms, the bus bar sections of the invention comprise a pair of channel-shaped members disposed in upright relationship with their lateral flanges facing inwardly towards each other, the channels being otherwise connected by a substantially medial web formed integrally with the parallel webs of the respective channels. Ventilating apertures are provided through the medial connecting web, at spaced intervals along its axial length, to insure dissipation of heat in the normal use of the bus bar, and axially extending grooves on the exposed surface of the bus bar section provide accurate centering means for drilling or punching holes through the same for mounting and joining purposes.

In more specific detail, and referring to the appended drawing, it will be observed that the bus bar 10 of Figs. 1 through 4 comprises opposed upright channel-shaped portions 12 disposed with their flanges facing inwardly towards each other in spaced parallel relationship. A substantially medially disposed web 14 integrally connects the webs of the channels 12 to provide a symmetrical rigid integral geometric structure of substantially H-form.

Apertures 15 through the web 14, at spaced intervals along its axial length, provide ventilating openings vertically through the same and between the oppositely disposed channels 12 forming the legs of the substantially H-section of the bus bar 10.

The bus bar section 10 can be produced by initially rolling the same as an H-beam and thereafter have the ends of its legs curled inwardly mechanically to provide the inwardly facing flanges of the channel portions 12. In the preferred practice of the invention, however, the bus bar section 10 is manufactured by extrusion in which case the precise geometric cross-section is produced in a single fabricating step by forcing or expressing a billet through a die orifice of the exact and desired cross-sectional configuration of the bus bar. Fabrication by extrusion also permits a wide choice in the cross-sectional distribution of the thickness of the bus bar, as indicated by the internal grooves 26 and reinforcing ribs 28, while permitting simultaneous formation of aperture-centering grooves 16 on the exterior surface of the bus bar section.

An installation employing the bus bar section 10 is illustrated in Fig. 4. Therein each length of bus bar section 10 is supported on one or more localized and axially positioned pedestals 18 secured to the flanges of the opposed channel portions 12 by means of bolts 20. The pedestals are in turn mounted on suitable electrical insulators 22, and adjacent end-abutting bus bar sections 10 are spliced together by splice plates 24. The exterior centering grooves 16 serve to accurately locate apertures for bolts 25 securing the splice plates 24, as well as any other attachment such as bus connector brackets or bars, leads, taps, or the like, normally required in a bus bar installation. The interior grooves 26, when located in registry with the exterior aperture-centering grooves 16, can be selected in such width that they will serve to prevent rotation of the heads of the fastening bolts 25.

It has been found in practice that the integral bus bar section 10 above described provides a compact rigid electrical conductor selectable in cross-sectional area to satisfy any given electrical capacity. The generally geometric H, or more specifically the integrally joined upright inwardly facing box channel form of the bus section, affords maximum strength against collapse and distortion for a given conductor capacity, and at the same time requires minimum mounting space in an installation of the same.

Aluminum and its alloys are readily adaptable to the fabrication of the bus bar section of the invention, although other electrically conductive metals, alloys and materials are equally suitable. Vertical ventilation through apertures 15 in the connecting web 14 insures heat dissipation, while the integral geometric H-form of the bus bar permits flat plate splicing and flat plate tap connections coupled with optimum rigidity and strength against distortion or collapse of installations employing the same. Apertures 15 also serve as drainage holes and prevent undue collection of moisture along the upper surface of the medial web 14 and the interior grooves 26 reduce the weight of the bus section, as well as permitting a certain degree of flexibility of the bus bar under severe electical loading.

Reference to Fig. 5 will disclose a modified form of bus section, wherein features similar to those incorporated in the section of Figs. 1 through 4 have been identified by the same reference numerals. It will be observed that the bus bar section 10 of Fig. 5 is substantially square, as distinguished from the rectangular form of the bus bar of Figs. 1 through 4. Otherwise the bus section of Fig. 5 is provided with only one internal groove 26 above and below the medial connecting web 14 in each of its channel portions 12, incorporates additional interior grooves 26 on the inwardly turned flanges of the channels 12, and has its medial connecting web sloped inwardly from the opposed channels towards the drainage and ventilating apertures 15. The bus bar section of Fig. 5 otherwise adapts itself to installation, spliced connection and use in the same manner as described for the structure of Figs. 1 through 4, axially extending tool or aperture centering exterior grooves 16 being provided in central alignment with the internal grooves 26 in all instances.

Although the invention has been described in terms of a specifically illustrated structure, it is not intended that the invention be limited thereto, except as defined in the following claim.

What is claimed is:

A one-piece integral extruded bus bar section capable of resisting deformation incident to conduction of relatively large current loads in the form of oppositely disposed channel portions arranged with their webs in upright position and their flanges facing towards each other in spaced relationship, a web connecting the webs of the channel portions midway of the depth thereof, grooves on the internal surface of each channel portion imparting a degree of flexibility to the channel portions under electrical loading of the same, a plurality of axially spaced ventilating and moisture draining apertures in the connecting web, and said connecting web being sloped inwardly on its upper surface from each channel portion towards the ventilating and moisture draining apertures.

References Cited in the file of this patent

UNITED STATES PATENTS

| | | | |
|---|---|---|---|
| 346,990 | Finney | Aug. 10, | 1886 |
| 1,037,099 | York | Aug. 27, | 1912 |
| 1,073,082 | Barbour | Sept. 16, | 1913 |
| 2,031,002 | Moore | Feb. 18, | 1936 |
| 2,057,273 | Little | Oct. 13, | 1936 |
| 2,138,617 | Scott | Nov. 29, | 1938 |
| 2,167,378 | Schoemaker | July 25, | 1939 |

OTHER REFERENCES

"Designing With Aluminum Extrusions," Reynolds Metals Company (1952), page 65.